United States Patent [19]
Kolk

[11] Patent Number: 5,210,983
[45] Date of Patent: May 18, 1993

[54] EXTRUDED SECTION FOR USE AS A RIDGE OR GUTTER SECTION IN A FOIL GREENHOUSE, AND FOIL GREENHOUSE PROVIDED WITH SUCH AN EXTRUDED SECTION

[76] Inventor: Hans J. P. Kolk, Meezenstraat 42,, 9271 EZ Zwaagwesteinde, Netherlands

[21] Appl. No.: 612,965

[22] Filed: Nov. 15, 1990

[30] Foreign Application Priority Data

Nov. 16, 1989 [NL] Netherlands .......................... 8902836

[51] Int. Cl.⁵ ............................................. E04B 1/12
[52] U.S. Cl. ........................................... 52/63; 52/64; 135/101
[58] Field of Search ..................... 52/64, 63; 135/101

[56] References Cited

U.S. PATENT DOCUMENTS

| | | | |
|---|---|---|---|
| 2,019,831 | 11/1935 | Ricardo | 52/64 |
| 4,381,629 | 5/1983 | Ahn | 52/63 X |
| 5,076,033 | 12/1991 | Patsy | 52/63 X |

FOREIGN PATENT DOCUMENTS

| | | |
|---|---|---|
| 0106290 | 5/1984 | European Pat. Off. . |
| 0306717 | 3/1989 | European Pat. Off. . |
| 1434570 | 10/1969 | Fed. Rep. of Germany . |
| 1525996 | 5/1968 | France . |
| 2511221 | 8/1981 | France . |
| 1518095 | 7/1978 | United Kingdom . |

*Primary Examiner*—Carl D. Friedman
*Assistant Examiner*—Beth A. Aubrey
*Attorney, Agent, or Firm*—Jacobson, Price, Holman & Stern

[57] ABSTRACT

This invention relates to an extruded section for use as a ridge or gutter section in a foil greenhouse, which section comprises at least one hollow extending in the longitudinal direction of the section. The hollow is accessible via a slot and is adapted to receive a thickened rim of a foil material. According to the invention the hollow is bounded by two superposed arms, at least one of them being sufficiently resilient for the arms to be bent apart to enable the thickened rim of a foil material to pass into the hollow and a further hollow is provided in the longitudinal direction of the section for receiving in operation a steel wire. The invention further relates to a foil greenhouse provided with at least a number of ridge or gutter sections comprising such an extruded section, to a foil sheet with a thickened rim suitable for cooperation with the present section, and to an auxiliary tool for zipping a thickened rim of a foil sheet into a hollow of an extruded section according to this invention.

13 Claims, 4 Drawing Sheets

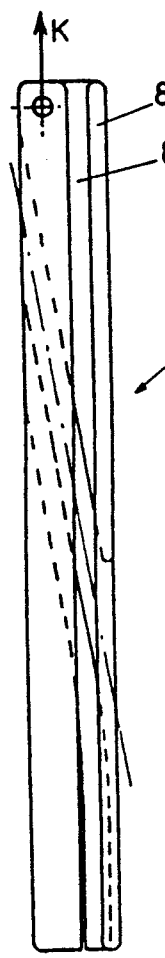 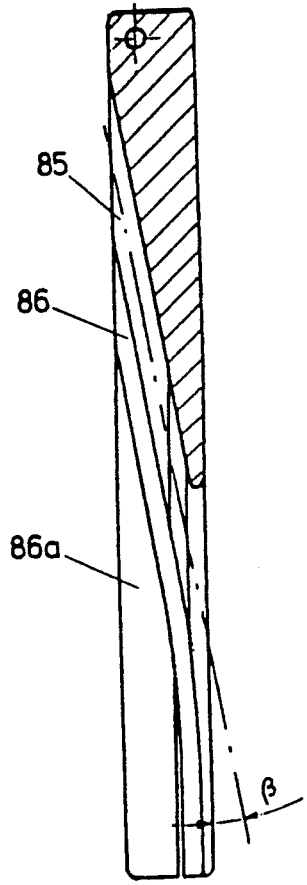 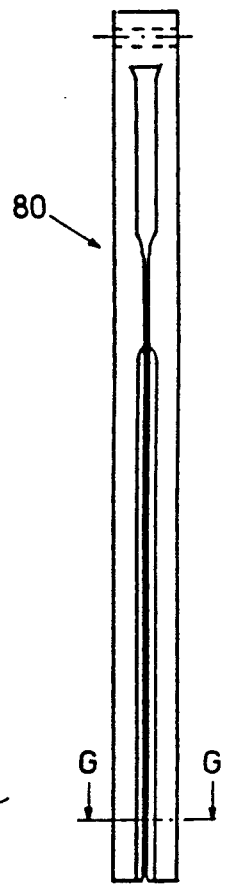 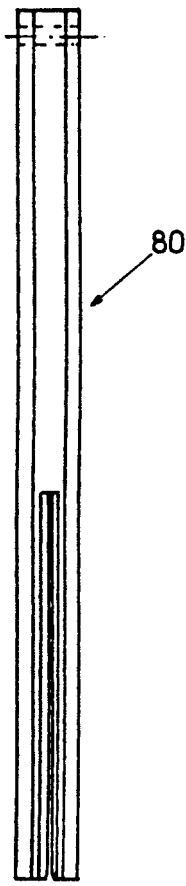
FIG.9a    FIG.9b    FIG.9c    FIG.9d
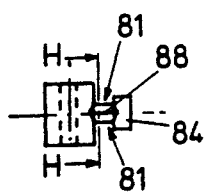  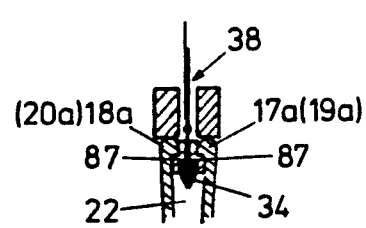
FIG.9e    FIG.9f    FIG.9g
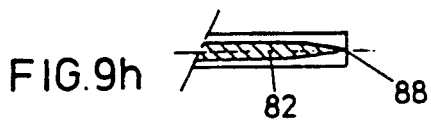
FIG.9h

EXTRUDED SECTION FOR USE AS A RIDGE OR GUTTER SECTION IN A FOIL GREENHOUSE, AND FOIL GREENHOUSE PROVIDED WITH SUCH AN EXTRUDED SECTION

This invention relates to an extruded section for use as a ridge or gutter section in a foil greenhouse, said extruded section comprising at least one hollow extending in the longitudinal direction of the section, said hollow being accessible from the exterior via a slot and adapted for receiving a thickened rim of a foil material. The invention further relates to a foil greenhouse, provided with such a ridge and/or gutter section.

A foil greenhouse is a greenhouse of which at least the roof portions are formed by foil material, explicitly understood herein to include plastics woven material, instead of rigid glass plates. European patent application 0306717 (Ikeda) discloses a foil greenhouse which comprises a plurality of trusses arranged one behind the other, and mutually connected by a plurality of purlins. Between each pair of trusses a foil sheet is arranged, extending from one foot of the truss over the ridge of the truss to the other foot. The trusses are provided with sections extending along the trusses, each section having at least one hollow which extends in the longitudinal direction of the section, i.e. along the corresponding truss.

The hollows of the sections of two successive trusses are accessible on the facing sides of the sections via a continuous slot extending also in the longitudinal direction.

The foil sheet has thickened longitudinal rims, which can be slid into the hollows from one end of the sections. During that operation the foil material itself slides through the slots of the sections. The thickened longitudinal rim can be formed by a wire or cord. The foil may for instance be wrapped about the wire or cord, so that at least at the location of the slot a double foil layer is provided.

European patent application 0106920 discloses a foil greenhouse which comprises ridge and gutter sections having at least two hollows provided one above the other, extending in the longitudinal direction of the sections and being accessible via a slot. These known sections are intended for use in constructing double-walled foil greenhouses by means of a tubular foil material. Each foil tube has four thickened longitudinal rims to be mounted pairwise in the superposed hollows of a ridge or gutter section.

In this known foil greenhouse, too, the thickened rims of the foil material must be slid into the hollows from the ends of the sections.

It has been found to be a drawback that the rims of the foil material must slid into the hollows from the ends of the sections, because that may involve very great frictional forces, especially when the continuous section is many tens of meters long. In order to overcome such great frictional forces, great tensile forces must be exerted on the foil material, so that the foil material may tear.

Further, the known foil greenhouses require that each time at least two thickened rims are slid into the corresponding section hollows at the same time. In double-cover greenhouses as described in European patent application 0106920 even four thickened rims must be slid into the corresponding section hollows at the same time. Thus the tensile forces to be overcome are doubled or quadrupled.

Further, the known method of construction requires that the foil rims, while being slid into the section hollows, are guided very carefully at the ends of the sections where they enter, because otherwise the foil material may catch behind the section end and tear.

The invention aims to overcome the drawbacks outlined above and generally to provide an effective, strong and yet simple extruded section which permits ready, quick and reliable construction of a foil greenhouse, in particular a foil greenhouse that comprises a plurality of saddle roofs.

To this effect, an extruded section of the type described hereinabove is characterized according to the invention in that each hollow provided for receiving a thickened rim of a foil material is bounded by two arms arranged above each other, at least one of said arms being so resilient that said arms can be bent apart to permit the thickened rim of a foil material to pass into said hollow, and that said extruded section comprises another hollow extending in the longitudinal direction of the section, which in operation mounts a steel wire.

A foil greenhouse comprising a plurality of uprights and triangular truss constructions arranged between neighboring uprights, the uprights supporting gutter sections and the truss constructions having support means carrying ridge sections is characterized according to the invention in that at least a number of ridge sections or a number of gutter sections comprise an extruded section of the type described hereinabove.

Some embodiments of the invention will now be further explained and illustrated with reference to the accompanying drawings, in which.

Figure 3:
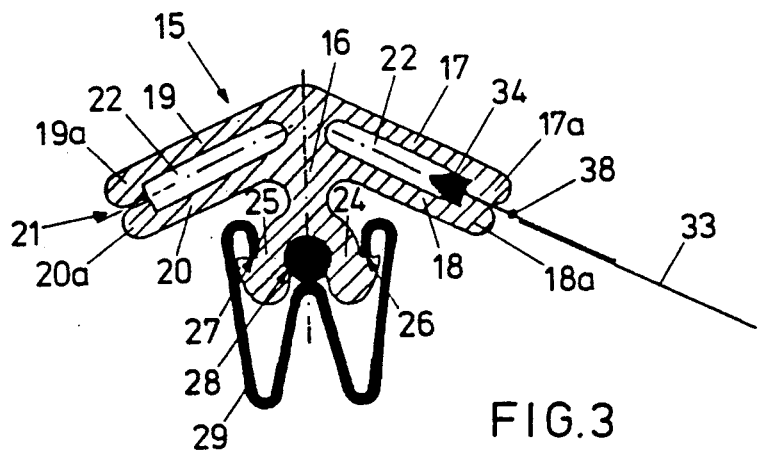
FIG. 3 is a schematic view of a first embodiment of a ridge section according to the invention.
Figure 4:
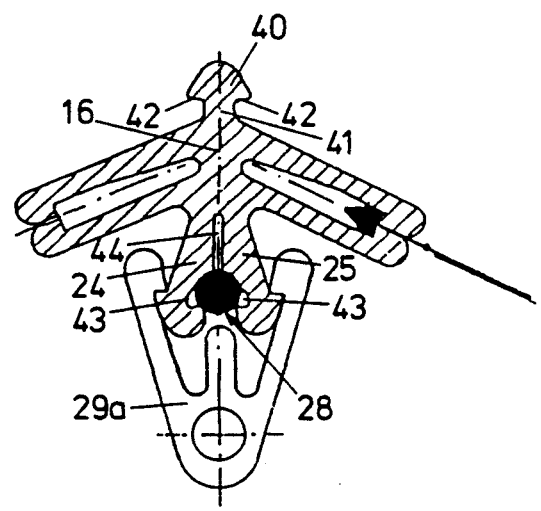
FIG. 4 is a schematic view of a second embodiment of a ridge section according to the invention.
Figure 5:
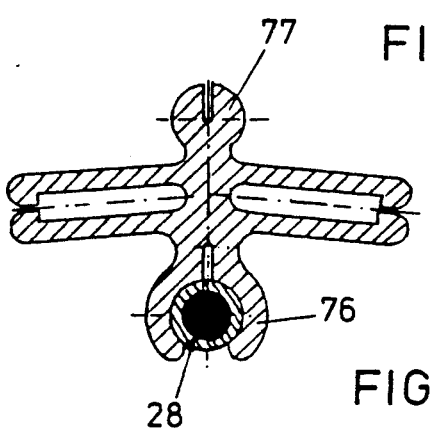
FIG. 5 is a schematic view of a third embodiment of a ridge section according to the invention.
Figure 6:
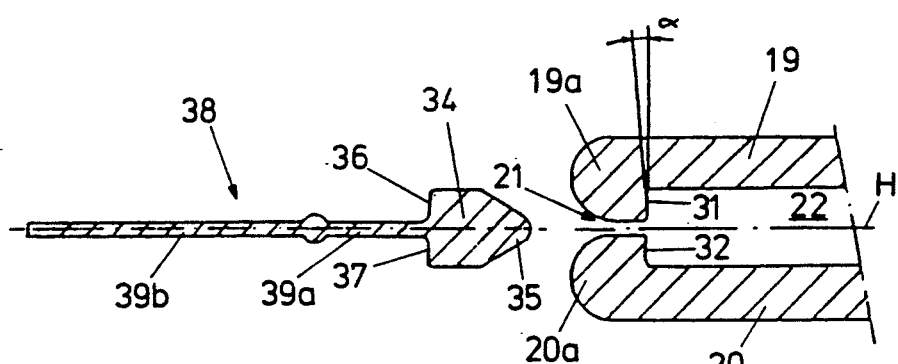
Figure 7:
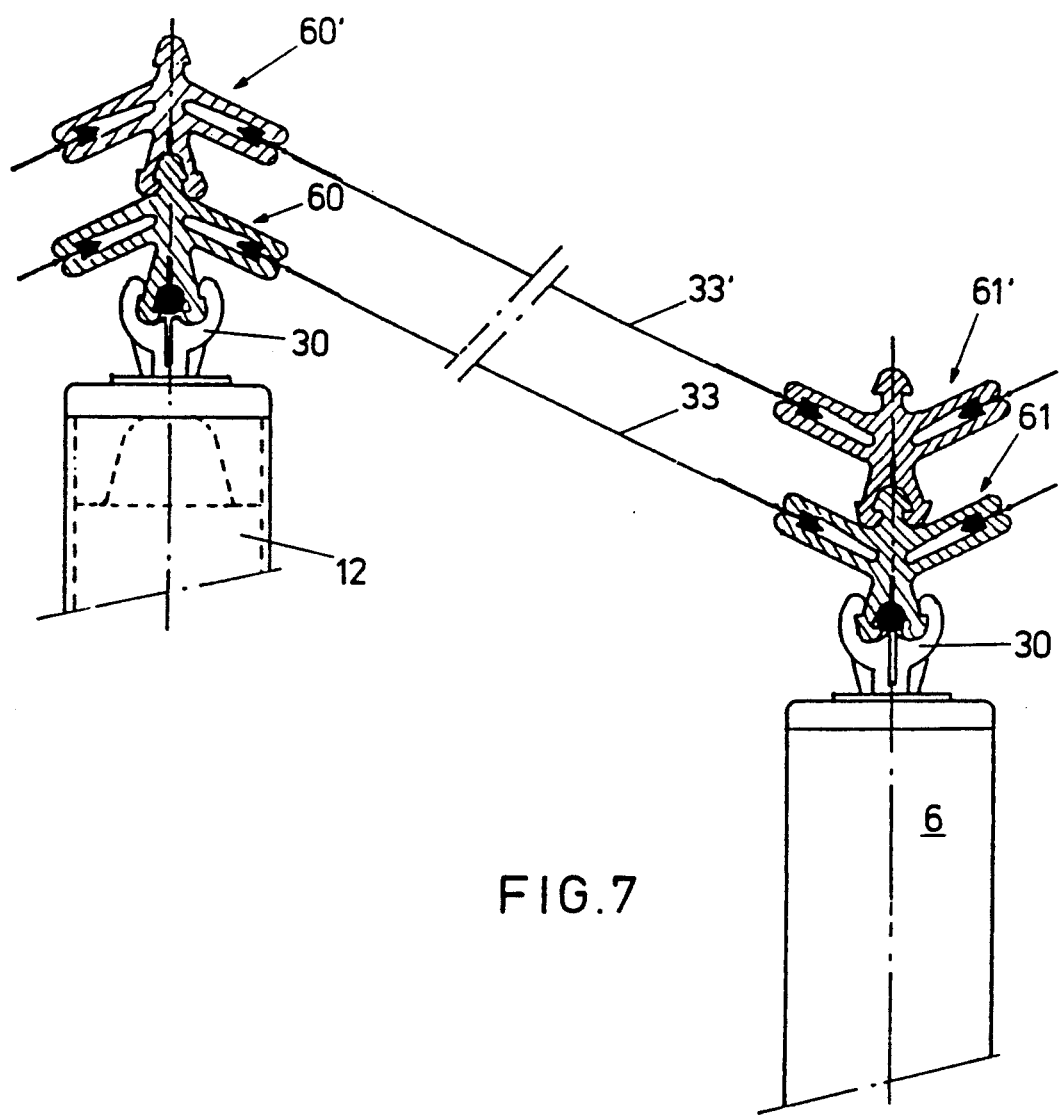
Figure 8:
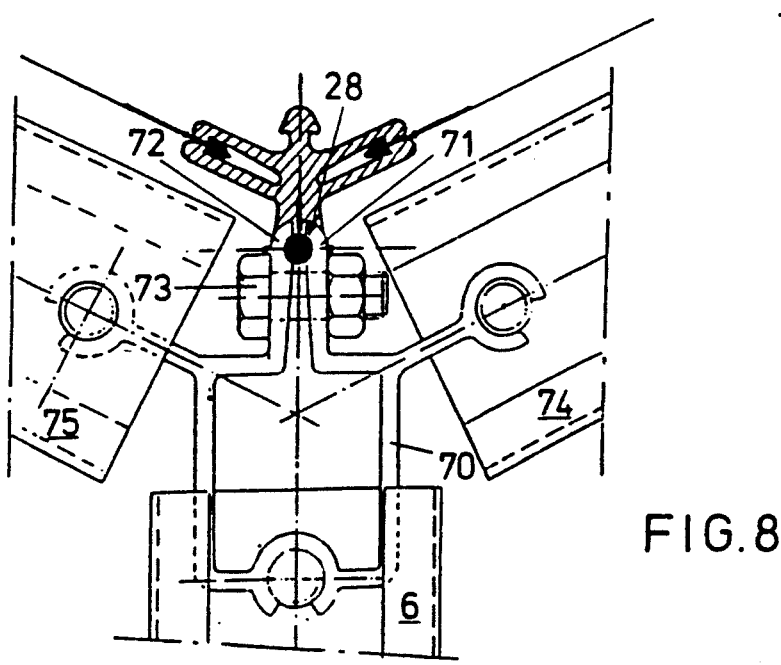

FIG. 6 schematically shows some details of FIGS. 3, 4 and 5;

FIG. 7 schematically illustrates the use of the ridge section of FIG. 4 in a double-roofed greenhouse with corresponding gutter sections according to the invention;

FIG. 8 illustrates, also schematically, the use of a gutter section of a type corresponding with the gutter section of FIG. 4; and FIGS. 9a–9h schematically shows different (sectional) views of an auxiliary tool for mounting a thickened rim of foil material in a hollow of a ridge or gutter section according to the invention.

Figure 1:
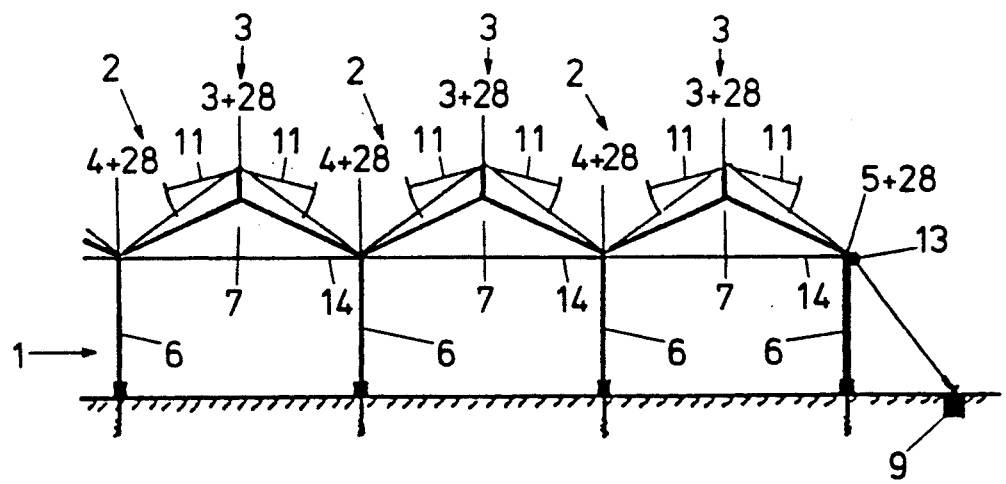
FIG. 1 is a schematic end view.
Figure 2:
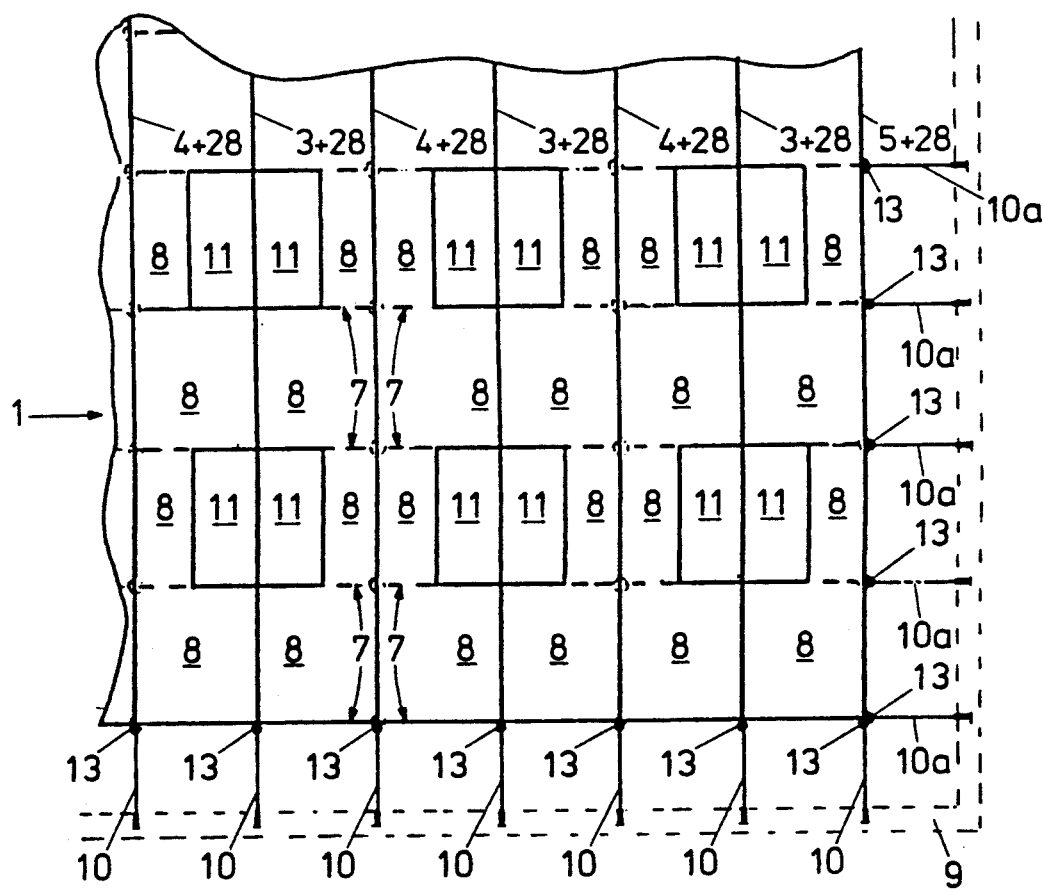
FIG. 2 is a schematic top plan view of an embodiment of a multi-covered greenhouse in which the invention is used.

FIG. 1 is a schematic end view and FIG. 2 is a schematic top plan view of a part of a multi-roofed Dutch-type greenhouse 1 in which the invention is used. The greenhouse shown comprises a plurality of interconnected covers 2 having ridges 3, intermediate gutters 4, and an end gutter 5. At the location of the gutters, the covers are supported by uprights 6, which are anchored in the ground in the usual manner. By means of steel wires 28 the uprights carry the gutter sections to be described hereinafter. Further, at least a number of the uprights corresponding to the successive gutter sections are connected by triangular truss constructions 7, which carry upright supports at or in the vicinity of the top, having steel wires 28 for ridge sections to be further described hereinafter. The continuous steel wires 28 which are protected against corrosion and on which the ridge and gutter sections are mounted are connected to a tensioning device 13 outside of the roof portion. The tensioning rods 10 are connected to a foundation ridge 9 or to foundation piles and keep the uprights straight up and thus form the wind bracing in the longitudinal direction.

In the embodiment shown, furthermore steel wires 14 are connected in a transverse direction to the uprights 6 so that a network of steel wires extends over the uprights. The steel wires 14, too, are connected to a tensioning device 13 outside the roof portion. Tensioning rods 10a are also connected to a foundation ridge 9 or to foundation piles and thereby keep the uprights straight up and thus form the wind bracing in the transverse direction. The wires 14 also serve as wires for crops. Uprights 6, trusses 7, steel wires 14 and 28 and tensioning rods 10 and 10a together form the framework of the greenhouse.

The roof portions 8 of the greenhouse shown consist of sheets of a translucent foil, for instance polyethylene foil or another suitable material, which may or may not be woven.

The construction is suitable for providing ventilation windows. FIGS. 1 and 2 show ventilation windows 11 which are mounted for hinging movement at the ridge, at the location of the trusses 7. The ventilation windows are provided after the foil or another material, which may or may not be woven, have been arranged between the ridge and gutter sections, after which the roof portion is cut open at the location of the ventilation window.

The vertical walls of the greenhouse may also be provided with such a foil, but may optionally comprise a glass or plastics plate and/or another suitable material.

FIG. 3 is a schematic cross-sectional view of a first embodiment of a ridge section 15 according to the invention. The section shown comprises a body 16 which on opposite sides is provided with pairs of superposed arms 17, 18 and 19, 20 extending obliquely downwards. As can be seen in FIGS. 7 and 8, the arms of the corresponding gutter section extend obliquely upwards.

The ridge and gutter sections according to the invention may advantageously be extruded from a suitable UV resistant plastics material, for instance PVC.

The superposed arms 17, 18 and 19, 20 are slightly resilient arms, which in this embodiment each have a thickened portion 17a, 18a, 19a, 20a at the free ends. When inoperative, the thickened portions of two cooperating arms may abut each other or, as shown for arms 19 and 20 (see also FIG. 6), leave a narrow slot 21.

Two cooperating arms further enclose a hollow 22 adapted to receive a thickened rim of a foil sheet, to be described hereinafter, the portion adjacent to the thickened rim extending through the slot 21. The resilient properties of the arms are such that two cooperating arms can be bent apart locally so far as to permit a thickened rim of a foil sheet to pass.

The ridge section shown further comprises two downwards extending legs 24, 25. The legs enclose a hollow and are slightly resilient so that the legs can be clicked about a steel wire 28 which may or may not be provided with a coating of a suitable plastic material or is otherwise protected against corrosion.

The steel wire gives the extruded section strength and is tensioned by means of tensioning means 13. The steel wire is in fact a part of the framework of the foil greenhouse. The steel wire also prevents creep in the longitudinal direction of the extruded section. In principle, the extruded section could be extruded directly about a steel wire, but this may lead to problems when greenhouses of great length are to be built.

In the embodiment shown the legs 24, 25 have outwardly turned shoulders 26, 27 for firmly mounting the legs in clamping means 30 (see FIG. 7) mounted on the uprights 6 or the supports 12, to enable the uptake of vertically upwardly directed forces due to overpressure in the greenhouse. Further, the steel wire is prevented from being pulled from the ridge or gutter section by the shoulders 26 and 27 in cooperation with steel or plastics clamping means 29 and 29a provided between the uprights. Clamping member 29a can further be used to suspend aids necessary in the crop production from.

As can be seen best in FIG. 6, the portions of the thickened ends of the arms that are turned towards the hollow 22 have slightly undercut edges 31, 32, i.e. these edges are slightly recessed viewed from the slot. In the embodiment shown the edges are flat faces which enclose an angle with the normal to the centre line H of the slot and, in this embodiment, also of the hollow 22.

The thickened edges of the foil sheets have an approximately complementary form, so that the arms together enclosing a hollow 22 will not be forced apart when in the foil sheet tensile forces occur which are directed transversely to the longitudinal direction of the ridge or gutter section.

FIG. 3 shows a foil sheet 33 with a weld-on section 38 having a thickened rim 34. FIG. 6 shows this on an enlarged scale. The thickened rim 34 of the weld-on section is substantially arrowhead-shaped in the example shown, the head 35 in mounted position pointing into the hollow 22 and the shoulders 36, 37 of the arrowhead catching behind the undercut edges 31, 32.

The arrowhead-shaped portion may also be directly formed as a part of the foil sheet. Other methods of attachment are possible. This portion may also be formed by wrapping the edge of the foil sheet about a suitable rod-shaped section or welding it thereto or attaching it in any other manner.

FIG. 4 shows a variant of FIG. 3. The section shown in FIG. 4 differs from that shown in FIG. 3 mainly in that a head 40 is provided. The head 40 is of such shape that it can be clicked between the legs of a similar section instead of a steel wire. Accordingly, the section shown in FIG. 4 is very suitable for double-walled greenhouse roofs, as shown in FIG. 7.

The head 40 is preferably connected to the body 16 via a thinner neck portion 41 so that shoulder faces 42 are formed. Then the hollow enclosed by the legs 24, 25 preferably has a shape complementary to that of the inner shoulder faces 43. Further, in the embodiment of FIG. 4 the legs 24, 25 are slightly longer than in the embodiment of FIG. 3, while, moreover, a slot 44 is formed in the body 16, extending from the hollow for receiving a steel wire 28 or a head 40. The resilient properties of the legs have thus been improved.

For the sake of completeness, FIG. 5 shows another variant of a ridge section according to the invention. Like the section of FIG. 4, this ridge section can be stacked. Accordingly, the legs 76 can again accommodate a steel wire, which may or may not be coated, or the head 77 of a similar section. Further, the ridge section shown again has a corresponding gutter section which differs from the ridge section only in that the arms extend obliquely upwards.

FIG. 7 schematically shows a double-walled greenhouse roof comprising two superposed foil sheets 33, 33' which are retained on the side of the ridge by stacked extruded sections 60, 60' of the type shown in FIG. 4. On the side of the gutter the foil sheets are retained by corresponding gutter sections 61, 61', which are also of the stackable type shown in FIG. 4, but have arms that point obliquely upwards.

FIG. 7 further shows clamping members 30, which are mounted on the top end of uprights 6 or on supports 12 and which grip the legs of the ridge and gutter sections.

FIG. 8 schematically illustrates an alternative way of mounting the sections on the supports or uprights. FIG. 8 shows an upright 6, which at the top carries a clamping member 70 having two arms 71, 72 extending upwards. The arms 71, 72 have a shape which is suitable for clamping a steel wire 28 as used for the reinforcement of the ridge and gutter sections according to the invention. In order to render the steel wire 28 accessible, the material of the legs of the section has been removed at that location. Advantageously, the lengths of sections can be selected such that they correspond exactly to the distance between two uprights (or supports). Between two successive lengths sufficient interspace can be maintained to provide space for the arms 71, 72 of a clamping member 70. Naturally, the steel wire should then be a continuous wire.

In the embodiment shown the clamp arms 71, 72 can be tightened or untightened by means of a clamp bolt 73.

In this embodiment the clamping member also serves as an attachment member for truss parts 74, 75.

An important aspect of the invention is that the cooperating arms are slightly resilient so that the thickened rim of the foil sheets can as it were be "zipped" into the hollow and need not be slid in from one end of a ridge or gutter section. A suitable auxiliary tool with which the foil sheets can be mounted in the manner described is shown in FIG. 9.

FIG. 9 schematically shows a side elevational view (FIG. 9a), a longitudinal sectional view (FIG. 9b), a top plan view (FIG. 9c), a bottom view (FIG. 9d), a front view (FIG. 9e), a rear view (FIG. 9f), a cross-sectional view (FIG. 9g) and a sectional front view (FIG. 9h) of an embodiment of an auxiliary tool for "zipping" a thickened rim of a foil sheet between the hollow-enclosing arms of an extruded section according to the invention. The auxiliary tool comprises an elongate body 80 which in the embodiment shown has a substantially rectangular shape.

On opposite sides of the body 80 along the entire length thereof, a groove-shaped recess 81 is provided, whose dimensions are so chosen that it can guide the thickened portions 17a, 18a, 19a and 20a of the arms of the ridge or gutter section. The rib 82 extending between the two recesses tapers at the front end (FIG. 9h). This tip 88 can drive apart the thickened portions 17a, 18a, 19a and 20a of the arms 17 and 18 or 19 and 20 of the ridge or gutter section. Body 84 will then be disposed in the hollow 22 of the section. Extending at an angle through body 80 is a rectangular channel 85 of such dimensions that the thickened rim 34 of the weld-on section 38 can pass through it. The thin portion 39a of the weld-on section or the foil passes through the slit-like gap 86. A weld, if any, can pass through the broadened gap 86a.

By moving the auxiliary tool according to FIG. 9 with body 84 in hollow 22 of a ridge or gutter section in direction K indicated in FIG. 9a, the thickened portions 17a/18a and 19a/20a of the arms at the location of the rectangular channel 85 are driven apart so far that the thickened rim 34 of the weld-on section 38 can pass. The shoulder faces 87 guide rim 34 of the weld-on section during the movement into the hollow 22 of the ridge or gutter section. After the auxiliary tool has passed, the arms 17, 18 and 19, 20 of the ridge or gutter section return to their original position to enclose the thickened rim 34 of the weld-or section.

The recesses 81, the rectangular channel 85 and the edges of the slit-like gap 86 can be rippled and mirror smooth to reduce gliding resistance.

It is observed that after perusal of the above various modifications will readily occur to anyone skilled in the art. Thus, instead of a steel wire 28, in principle a wire could be used of any other suitable material which has similar properties as steel wire does with respect to resilience, tensile strength and the like. Further, modifications of details of the sections shown are possible. Also, for use at the peripheral gutters, as shown at 5 in FIGS. 1 and 2, a section could be developed which is provided with a hollow on only one side. Alternatively, a section could be used which on one side has upwardly directed arms for accommodating the rim of a foil sheet and on the other downwardly directed arms for accommodating a rim of a foil sheet extending obliquely towards the ground. Instead of a foil sheet, for instance a strip of a suitable material could be zipped between the obliquely downwardly extending arms of such a peripheral section, which strip in turn might have attachment eyes or the like for tensioning means.

In principle it is also possible that only one of the arms together enclosing a hollow is resilient and/or that only one of the arms has a thickened portion for a thickened rim of a foil sheet to be caught behind.

These and similar modifications are considered to fall within the scope of the invention.

I claim:

1. An extruded section for use as a ridge or gutter section in a foil greenhouse, said extruded section comprising at least one hollow extending in the longitudinal direction of the section, said hollow being accessible from the exterior via a slot and adapted for receiving a thickened rim of a foil material, characterized in that the hollow is bounded by two arms arranged above each other, at least one of said arms being so resilient that said arms can be bent apart sufficiently to permit the thickened rim of a foil material to pass into said hollow, and that said extruded section comprises another hollow extending in the longitudinal direction of the section, for mounting an elongate metal element, characterized in that said extruded section comprises a body with said arms extending outwardly from the body, at least one of the arms having an end remote from the body with a thickened rim turned towards an oppositely arranged end of the other arm of said pair and characterized in that the body further comprises two legs which enclose said another hollow.

2. An extruded section according to claim 1, characterized in that two pairs of said arms extend from the body, on opposite sides thereof, the arms extend obliquely, and symmetrically relatively to the body.

3. An extruded section according to claim 1, characterized in that each hollow is elongate in cross-section and that the arms of a pair are formed symmetrically relatively to the corresponding hollow.

4. An extruded section according to claim 1, characterized in that the section comprises a topmost projection and a bottommost recess so that the topmost projection can be retained in the bottommost recess of a similar section.

5. An extruded section according to claim 4, characterized in that the bottommost recess is adapted for mounting and clamping a steel wire or the topmost projection of a similar section.

6. An extruded section according to claim 1, characterized in that at least one of the arms of a pair of arms enclosing a hollow has an undercut surface at an outer end of the hollow proximal to the slot for a thickened rim of a foil sheet to catch behind.

7. An extruded section according to claim 1, characterized in that the legs are each provided with an outwardly extending shoulder.

8. An extruded section as claimed in claim 1 in combination with a foil sheet having a thickened rim received in said hollow and characterized in that the thickened rim is arrowhead shaped.

9. A foil greenhouse comprising a plurality of uprights and triangular truss constructions arranged between adjacent uprights, the uprights supporting gutter sections and the truss constructions having support means which in turn carry ridge sections, characterized in that at least a number of ridge sections or a number of gutter sections each comprise an extruded section comprising at least one hollow extending in the longitudinal direction of the section, said hollow being accessible from the exterior via a slot and adapted for receiving a thickened rim of a foil material, characterized in that the hollow is bounded by two arms arranged above each other, at least one of said arms being so resilient that said arms can be bent apart sufficiently to permit the thickened rim of a foil material to pass into said hollow, and that said extruded section comprises another hollow extending in the longitudinal direction of the section, for mounting an elongate metal element, further characterized by steel wires extending transversely to the gutter sections, which in operation together with the elongate metal elements mounted in the gutter sections, form a network which is part of the framework of the greenhouse.

10. A foil greenhouse comprising a plurality of uprights and triangular truss constructions arranged between adjacent uprights, the uprights supporting gutter sections and the truss constructions having support means which in turn carry ridge sections, characterized in that at least a number of ridge sections or a number of gutter sections each comprise an extruded section comprising at least one hollow extending in the longitudinal direction of the section, said hollow being accessible from the exterior via a slot and adapted for receiving a thickened rim of a foil material, characterized in that the hollow is bounded by two arms arranged above each other, at least one of said arms being so resilient that said arms can be bent apart sufficiently to permit the thickened rim of a foil material to pass into said hollow, and that said extruded section comprises another hollow extending in the longitudinal direction of the section, for mounting an elongate metal element, further characterized in that the uprights and/or the supports carry clamping means at the top for mounting and clamping therein the gutter sections or the ridge sections and that the clamping means are adapted to click about the legs of a gutter or ridge section.

11. A foil greenhouse according to claim 10, provided with ridge and/or gutter sections, wherein said another hollow is formed by legs with outwardly extending shoulders characterized in that the clamping means have further shoulders which in mounted position engage behind the shoulders of the legs of the sections.

12. A foil greenhouse according to claim 10, characterized in that the elongate metal element for each extruded section is protected against corrosion.

13. A foil greenhouse according to claim 10, characterized by pairs of superposed gutter and ridge sections connected together by interfitting topmost and bottommost fittings there being provided foil sheets with thickened rims between the upper gutter and ridge sections as well as between the lower gutter and ridge sections.

* * * * *